United States Patent
Takeshima

(10) Patent No.: US 6,400,762 B2
(45) Date of Patent: *Jun. 4, 2002

(54) VIDEO SIGNAL PROCESSING CIRCUIT AND VIDEO SIGNAL PROCESSING METHOD

(75) Inventor: Masahiro Takeshima, Takatsuki (JP)

(73) Assignee: Matsushita Electric Industrial Co., Ltd., Osaka-fu (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/353,924

(22) Filed: Jul. 15, 1999

(30) Foreign Application Priority Data

Jul. 16, 1998 (JP) .......................... 10-201590

(51) Int. Cl.[7] .................................. H04N 7/12
(52) U.S. Cl. ................................. 375/240.01
(58) Field of Search ................ 348/400, 402, 348/410, 413, 416, 451, 620, 621, 663; 375/240, 240.01

(56) References Cited

U.S. PATENT DOCUMENTS

| | | | | |
|---|---|---|---|---|
| 4,268,855 A | * | 5/1981 | Takahashi | 348/620 |
| 4,658,285 A | * | 4/1987 | Lewis, Jr. | 348/621 |
| 5,021,870 A | * | 6/1991 | Motoe et al. | 348/451 |
| 5,475,445 A | * | 12/1995 | Yamaguchi et al. | 348/663 |
| 5,734,738 A | * | 3/1998 | Sato | 382/128 |
| 5,990,978 A | * | 11/1999 | Kim et al. | 348/663 |

FOREIGN PATENT DOCUMENTS

| | | |
|---|---|---|
| EP | 0546840 | 6/1993 |
| JP | 02013088 | 1/1990 |
| JP | 02184176 A | 7/1990 |
| JP | 04328988 | 11/1992 |
| JP | 07087519 | 3/1995 |
| JP | 7-110049 | 11/1995 |
| JP | 08046992 | 2/1996 |

OTHER PUBLICATIONS

European Search Report for European Patent Application No. EP 99 30 56 10, dated Aug. 23, 2001 (3 Pages).

* cited by examiner

Primary Examiner—Chris Kelley
Assistant Examiner—Allen Wong
(74) Attorney, Agent, or Firm—Akin, Gump, Strauss, Hauer & Feld, L.L.P.

(57) ABSTRACT

A first motion detection circuit detects presence/absence of motion in an image on the basis of a composite video signal and an output signal of a frame memory. A three-dimensional Y/C separation circuit separates a luminance signal and a chrominance signal from the composite video signal by an inter-frame operation or an intra-frame operation on the basis of a motion signal output from the first motion detection circuit. A motion detection circuit detects presence/absence of motion in the image on the basis of the luminance signal output from the three-dimensional Y/C separation circuit. A synthesizing circuit synthesizes motion signals output from the first motion detection circuit and a second motion detection circuit. A three-dimensional noise reduction circuit reduces noise of the luminance signal output from the three-dimensional Y/C separation circuit by an inter-frame operation or an intra-frame operation on the basis of an output signal of the synthesizing circuit.

10 Claims, 3 Drawing Sheets

US 6,400,762 B2

VIDEO SIGNAL PROCESSING CIRCUIT AND VIDEO SIGNAL PROCESSING METHOD

BACKGROUND OF THE INVENTION

1. Field of the Invention

The present invention relates to a video signal processing circuit and a video signal processing method having a function of reducing noise of a video signal on the basis of a result of motion detection for an image.

2. Description of the Prior Art

In order to improve the S/N (signal-to-noise ratio) of a video signal, Japanese Laid-Open Patent No. 2-184176 (1990), for example, proposes a noise reduction circuit. This noise reduction circuit reduces noise by an inter-frame operation or an inter-line operation of a video signal in response to presence/absence of motion in an image. Thus, the S/N of the video signal can be improved in response to the type of the image.

Further improvement of the S/N is awaited for satisfying the recent requirement for higher picture quality. However, a video signal processing circuit must be miniaturized and reduced in cost, and hence it is unpreferable to complicate and increase the size of the noise reduction circuit for improving the S/N of a video signal.

SUMMARY OF THE INVENTION

An object of the present invention is to provide a video signal processing circuit capable of further improving picture quality with a relatively simple structure.

Another object of the present invention is to provide a video signal processing method capable of further improving picture quality with a relatively simple structure.

A video signal processing circuit according to an aspect of the present invention comprises a detection circuit detecting presence/absence of motion in an image, a separation circuit separating a luminance signal and a chrominance signal from a composite video signal by an inter-frame operation or an intra-frame operation on the basis of the result of detection by the detection circuit, and a noise reduction circuit reducing noise of at least the luminance signal output from the separation circuit by an inter-frame operation or an intra-frame operation on the basis of the result of detection by the detection circuit.

In the video signal processing circuit, presence/absence of motion in the image is detected so that the luminance signal and the chrominance signal are separated from the composite video signal by an inter-frame operation or an intra-frame operation on the basis of the result of detection. At this time, noise of the composite video signal is reduced by an inter-frame operation. Further, noise of at least the luminance signal is reduced by an inter-frame operation or an intra-frame operation on the basis of the result of detection of motion in the image.

Thus, noise of the composite video signal is reduced and noise of at least the luminance signal is reduced in the separated luminance and chrominance signals, whereby the S/N of the video signal is further improved.

The detection circuit may include a motion detection circuit detecting presence/absence of motion in the image on the basis of the composite video signal, the separation circuit may separate the luminance signal and the chrominance signal from the composite video signal by an inter-frame operation or an intra-frame operation on the basis of an output signal of the motion detection circuit, and the noise reduction circuit may reduce noise of at least the luminance signal output from the separation circuit by an inter-frame operation or an intra-frame operation on the basis of the output signal of the motion detection circuit.

In this case, presence/absence of motion in the image is detected on the basis of the composite video signal, and the luminance signal and the chrominance signal are separated from the composite video signal by an inter-frame operation or an intra-frame operation on the basis of the result of detection. At this time, noise of the composite video signal is reduced by an inter-frame operation. Further, noise of at least the luminance signal is reduced by an inter-frame operation or an intra-frame operation on the basis of the result of detection of motion in the image.

Thus, noise of the composite video signal is reduced and noise of at least the luminance signal is reduced in the separated luminance and chrominance signals, whereby the S/N of the video signal is further improved.

Further, the motion detection circuit is provided in common for the separation circuit and the noise reduction circuit, whereby the circuit scale is not increased but the cost can be reduced.

Thus, the picture quality can be further improved with a simple structure.

The separation circuit may perform an intra-frame operation when the output signal of the motion detection circuit indicates presence of motion in the image and perform an inter-frame operation when the output signal of the motion detection circuit indicates absence of motion in the image, and the noise reduction circuit may perform an intra-frame operation or no operation when the output signal of the motion detection circuit indicates presence of motion in the image and may perform an inter-frame operation when the output signal of the motion detection circuit indicates absence of motion in the image.

In this case, the luminance signal and the chrominance signal are separated by an intra-frame operation when the image has motion, while the luminance signal and the chrominance signal are separated by an inter-frame operation when the image has no motion. Thus, high picture quality is obtained by an inter-frame operation as to a still picture.

Further, at least the luminance signal is subjected to an intra-frame operation or directly output with no operation in the separated luminance and chrominance signals when the image has motion, while at least the luminance signal is subjected to an inter-frame operation when the image has no motion. Thus, noise is reduced by an inter-frame operation as to a still picture.

Thus, the picture quality can be further improved in response to a motion picture and a still picture.

The video signal processing circuit may further comprise a first delay circuit delaying the composite video signal by one or more vertical scanning periods and a second delay circuit delaying at least the luminance signal output from the separation circuit by one or more vertical scanning periods, the motion detection circuit may detect presence/absence of motion in the image by operating the composite video signal and an output signal of the first delay circuit, the separation circuit may separate the luminance signal and the chrominance signal from the composite video signal by operating the composite video signal and the output signal of the first delay circuit, and the noise reduction circuit may reduce noise of at least the luminance signal output from the separation circuit by operating at least the luminance signal output from the separation circuit and an output signal of the second delay circuit.

In this case, the composite video signal is delayed by one or more vertical scanning periods and presence/absence of motion in the image is detected through the video signal and the delayed signal while the luminance signal and the chrominance signal are separated from the composite video signal by an inter-frame operation.

Further, at least the luminance signal is delayed by one or more vertical scanning periods, and noise of at least the luminance signal is reduced through at least the luminance signal and the delayed signal.

The motion detection circuit may calculate a differential value between the composite video signal and the output signal of the first delay circuit, for detecting presence/absence of motion in the image on the basis of the calculated differential value.

The motion detection circuit may determine that the image has motion when the calculated differential value is greater than a prescribed value, and determine that the image has no motion when the calculated differential value is not greater than the prescribed value.

The motion detection circuit may determine that the image has motion when the calculated differential value is greater than a first value, determine that the image has no motion when the calculated differential value is less than a second value, and determine that motion of the image is in an intermediate state when the calculated differential value is within the range from the first value to the second value.

The separation circuit may perform an operation employing a result of an intra-frame operation and a result of an inter-frame operation when the motion detection circuit determines that motion of the image is in the intermediate state, and the noise reduction circuit may perform an operation employing a result of an intra-frame operation and a result of an inter-frame operation when the motion detection circuit determines that motion of the image is in the intermediate state.

The detection circuit may include a first motion detection circuit detecting presence/absence of motion in the image on the basis of the composite video signal, a second motion detection circuit detecting presence/absence of motion in the image on the basis of at least the luminance signal output from the separation circuit and a synthesizing circuit synthesizing output signals of the first motion detection circuit and the second motion detection circuit, the separation circuit may separate the luminance signal and the chrominance signal from the composite video signal by an inter-frame operation or an intra-frame operation on the basis of the output signal of the first motion detection circuit, and the noise reduction circuit may reduce noise of at least the luminance signal output from the separation circuit by an inter-frame operation or an intra-frame operation on the basis of an output signal of the synthesizing circuit.

In this case, presence/absence of motion in the image is detected on the basis of the composite video signal and the luminance signal and the chrominance signal are separated from the composite video signal by an inter-frame operation or an intra-frame operation on the basis of the result of detection. At this time, noise of the composite video signal is reduced by an inter-frame operation.

Further, presence/absence of motion in the image is detected on the basis of at least the separated luminance signal, and the result of motion detection through the composite video signal and the result of motion detection through at least the luminance signal are synthesized. On the basis of the result of this synthesis, noise of at least the luminance signal is reduced by an inter-frame operation or an intra-frame operation.

Thus, noise of the composite video signal is reduced and noise of at least the luminance signal is reduced in the separated luminance and chrominance signals, whereby the S/N of the video signal is further improved.

In particular, noise of at least the luminance signal is reduced on the basis of the result of motion detection through the composite video signal and the result of motion detection through at least the luminance signal after separation, whereby motion detection is more correctly performed.

Further, the first motion detection circuit is provided in common for the separation circuit and the noise reduction circuit, whereby the circuit scale is not increased but the cost can be reduced.

Thus, the picture quality can be further improved with a simple structure.

The separation circuit performs an intra-frame operation when the output signal of the first motion detection circuit indicates presence of motion in the image and performs an inter-frame operation when the output signal of the first motion detection circuit indicates absence of motion in the image, and the noise reduction circuit performs an intra-frame operation or no operation when the output signal of the synthesizing circuit indicates presence of motion in the image and performs an inter-frame operation when the output signal of the synthesizing circuit indicates absence of motion in the image.

In this case, the luminance signal and the chrominance signal are separated by an intra-frame operation when the image has motion while the luminance signal and the chrominance signal are separated by an inter-frame operation when the image has no motion. Thus, higher picture quality can be obtained by an inter-frame operation as to a still picture.

Further, at least the luminance signal is subjected to an intra-frame operation or directly output with no operation in the separated luminance and chrominance signals when the image has motion, while at least the luminance signal is subjected to an inter-frame operation when the image has no motion. Thus, noise is reduced by an inter-frame operation as to a still picture.

Thus, the picture quality can be further improved in response to a motion picture and a still picture.

The video signal processing circuit further comprises a first delay circuit delaying the composite video signal by one or more vertical scanning periods and a second delay circuit delaying at least the luminance signal output from the separation circuit by one or more vertical scanning periods, the first motion detection circuit detects presence/absence of motion in the image by operating the composite video signal and an output signal of the first delay circuit, the separation circuit separates the luminance signal and the chrominance signal from the composite video signal by operating the composite video signal and the output signal of the first delay circuit, the second motion detection circuit detects presence/absence of motion in the image by operating at least the luminance signal output from the separation circuit and an output signal of the second delay circuit, and the noise reduction circuit reduces noise of at least the luminance signal output from the separation circuit by operating at least the luminance signal output from the separation circuit and the output signal of the second delay circuit.

In this case, the composite video signal is delayed by one or more vertical scanning periods, presence/absence of motion in the image is detected through the video signal and the delayed signal, and the luminance signal and the chrominance signal are separated from the composite video signal by an inter-frame operation.

Further, at least the luminance signal is delayed by one or more vertical scanning periods, presence/absence of motion in the image is detected through at least the luminance signal and the delayed signal, and noise of at least the luminance signal is reduced on the basis of a synthesized result of motion detection.

The first motion detection circuit may calculate a differential value between the composite video signal and the output signal of the first delay circuit and detect presence/absence of motion in the image on the basis of the calculated differential value, and the second motion detection circuit may calculate a differential value between at least the luminance signal output from the separation circuit and the output signal of the second delay signal and detect presence/absence of motion in the image on the basis of the calculated differential value.

The first motion detection circuit may determine that the image has motion when the calculated differential value is greater than a prescribed value and determine that the image has no motion when the calculated differential value is not greater than the prescribed value, and the second motion detection circuit may determine that the image has motion when the calculated differential value is greater than a prescribed value and determine that the image has no motion when the calculated value is not greater than the prescribed value.

The first motion detection circuit may determine that the image has motion when the calculated differential value is greater than a first value, determine that the image has no motion when the calculated differential value is less than a second value, and determine that motion of the image is in an intermediate state when the calculated differential value is within the range from the first value to the second value, and the second motion detection circuit may determine that the image has motion when the differential value is greater than a third value, determine that the image has no motion when the differential value is less than a fourth value, and determine that motion of the image is in an intermediate state when the differential value is within the range from the third value to the fourth value.

The separation circuit may perform an operation employing a result of an intra-frame operation and a result of an inter-frame operation when the first motion detection circuit determines that motion of the image is in the intermediate state, and the noise reduction circuit may perform an operation employing a result of an intra-frame operation and a result of an inter-frame operation when the second motion detection circuit determines that motion of the image is in the intermediate state.

The synthesizing circuit may perform synthesis by an operation employing output signals of the first motion detection circuit and the second motion detection circuit.

The separation circuit may separate the luminance signal and the chrominance signal from the composite video signal by an operation using composite video signals of adjacent two lines as an intra-frame operation when the detection circuit detects presence of motion in the image, and separate the luminance signal and the chrominance signal from the composite video signal by an operation using composite video signals of the same lines in continuous two frames as an inter-frame operation when the detection circuit detects absence of motion in the image.

The noise reduction circuit may perform an operation using at least luminance signals of adjacent two lines as an intra-frame operation or perform no operation when the detection circuit detects presence of motion in the image and perform an operation using at least luminance signals of the same lines in continuous two frames as an inter-frame operation when the detection circuit detects absence of motion in the image.

The separation circuit may include a three-dimensional Y/C separation circuit, and the noise reduction circuit may include a three-dimensional noise reduction circuit.

In this case, the three-dimensional Y/C separation circuit separates the luminance signal and the chrominance signal from the composite video signal by an intra-frame operation as to a motion picture, and separates the luminance signal and the chrominance signal from the composite video signal by an inter-frame operation and reduces noise of the composite video signal as to a still picture. The three-dimensional noise reduction circuit reduces noise of at least the luminance signal by an intra-frame operation or directly outputs the luminance signal as to a motion picture, and reduces at least noise of the luminance signal as to a still picture.

A video signal processing circuit according to another aspect of the present invention comprises a three-dimensional Y/C separation circuit, a three-dimensional noise reduction circuit and a motion detection circuit for an image provided in common for the three-dimensional Y/C separation circuit and the three-dimensional noise reduction circuit.

In the video signal processing circuit, the three-dimensional Y/C separation circuit separates a luminance signal and a chrominance signal from a composite video signal by three-dimensional Y/C separation and reduces noise of the composite video signal as to a still picture, and separates the luminance signal and the chrominance signal from the composite video signal by two-dimensional Y/C separation as to a motion picture. The three-dimensional noise reduction circuit reduces noise of at least the luminance signal by three-dimensional noise reduction as to a still picture, and reduces noise of at least the luminance signal by two-dimensional noise reduction or directly outputs the luminance signal as to a motion picture.

Thus, noise of the composite video signal is reduced and noise of at least the luminance signal is reduced in the separated luminance and chrominance signals, whereby the S/N of the video signal is further improved.

Further, the motion detection circuit is provided in common for the three-dimensional Y/C separation circuit and the three-dimensional noise reduction circuit, whereby the circuit scale is not increased but the cost can be reduced.

Thus, the picture quality can be further improved with a simple structure.

A video signal processing method according to still another aspect of the present invention includes steps of detecting presence/absence of motion in an image, separating a luminance signal and a chrominance signal from a composite video signal by an inter-frame operation or an intra-frame operation on the basis of the result of detection of presence/absence of motion in the image, and reducing noise of at least the luminance signal by an inter-frame operation or an intra-frame operation on the basis of the result of detection of presence/absence of motion in the image.

In the video signal processing method, noise of the composite video signal is reduced and noise of at least the luminance signal is reduced in the separated luminance and chrominance signals, whereby the S/N of the video signal is further improved.

The detecting step may include a step of detecting presence/absence of motion in the image on the basis of the composite video signal, the separating step may include a step of separating the luminance signal and the chrominance signal from the composite video signal by an inter-frame operation or an intra-frame operation on the basis of the result of detection of presence/absence of motion through the composite video signal, and the reducing step may include a step of reducing noise of at least the luminance signal by an inter-frame operation or an intra-frame operation on the basis of the result of detection of presence/absence of motion through the composite video signal.

In this case, noise of the composite video signal is reduced and noise of at least the luminance signal is reduced in the separated luminance and chrominance signals, whereby the S/N of the video signal is further improved.

Further, a common result of motion detection is employed for separating the luminance signal and the chrominance signal and reducing noise of at least the separated luminance signal, whereby the circuit scale is not increased but the cost can be reduced.

Thus, the picture quality can be further improved with a simple structure.

The detecting step may include steps of detecting presence/absence of motion in the image on the basis of the composite video signal and detecting presence/absence of motion in the image on the basis of at least the separated luminance signal, the separating step may include a step of separating the luminance signal and the chrominance signal from the composite video signal by an inter-frame operation or an intra-frame operation on the basis of the result of detection of presence/absence of motion through the composite video signal, and the reducing step may include a step of reducing noise of at least the luminance signal by an inter-frame operation or an intra-frame operation on the basis of the result of detection of presence/absence of motion through at least the luminance signal.

In this case, noise of the composite video signal is reduced and noise of at least the luminance signal is reduced in the separated luminance and chrominance signals, whereby the S/N of the video signal is further improved.

In particular, noise of at least the luminance signal is reduced on the basis of the result of motion detection through the composite video signal and the result of motion detection through at least the luminance signal after separation, whereby motion detection is more correctly performed.

Further, a common result of motion detection is employed for separating the luminance signal and the chrominance signal and reducing noise of at least the separated luminance signal, whereby the circuit scale is not increased but the cost can be reduced.

Thus, the picture quality can be further improved with a simple structure.

According to the video signal processing circuit and the video signal processing method of the present invention, as hereinabove described, noise is reduced when the luminance signal and the chrominance signal are separated from the composite video signal and noise of at least the luminance signal after separation is reduced, whereby the S/N of the video signal is further improved. Thus, the picture quality can be further improved with a simple structure.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
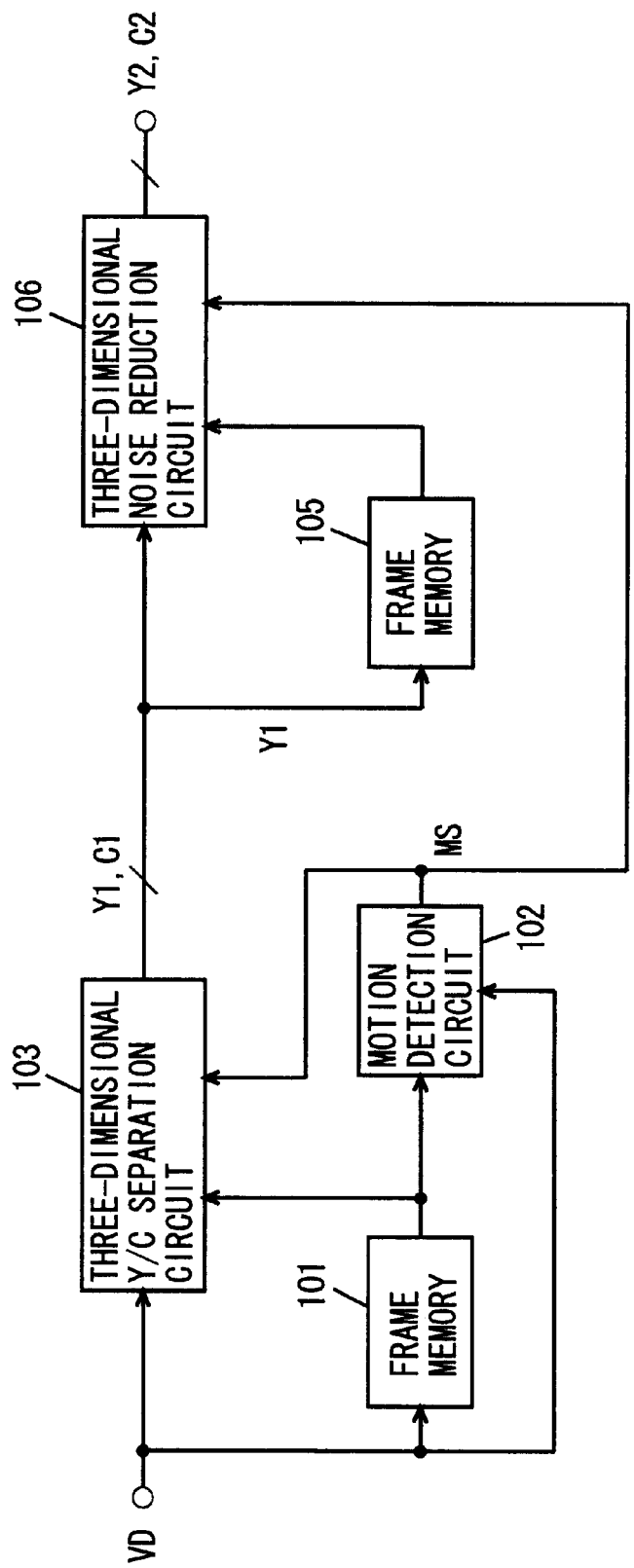
FIG. 1 is a block diagram showing a video signal processing circuit according to a first embodiment of the present invention.

FIG. 1 is a block diagram showing a video signal processing circuit according to a first embodiment of the present invention.

The video signal processing circuit shown in FIG. 1 includes a frame memory 101, a motion detection circuit 102, a three-dimensional Y/C separation circuit 103, another frame memory 105 and a three-dimensional noise reduction circuit 106.

A composite video signal VD is supplied to the frame memory 101, the motion detection circuit 102 and the three-dimensional Y/C separation circuit 103. The frame memory 101 delays the composite video signal VD by one frame period. An output signal of the frame memory 101 is supplied to the motion detection circuit 102 and the three-dimensional Y/C separation circuit 103.

The motion detection circuit 102 detects presence/absence of motion in an image on the basis of the composite video signal VD and the output signal of the frame memory 101, and outputs a motion signal MS indicating the result of detection. The motion signal MS output from the motion detection circuit 102 is supplied to the three-dimensional Y/C separation circuit 103 and the three-dimensional noise reduction circuit 106.

The three-dimensional Y/C separation circuit 103 performs three-dimensional Y/C separation or two-dimensional Y/C separation on the composite video signal VC on the basis of the output signal of the frame memory 101 and the motion signal MS output from the motion detection circuit 102, and outputs a luminance signal Y1 and a chrominance signal C1. The luminance signal Y1 and the chrominance signal C1 output from the three-dimensional Y/C separation circuit 103 is supplied to the three-dimensional noise reduction circuit 106, and the luminance signal Y1 is also supplied to the frame memory 105.

The frame memory 105 delays the luminance signal Y1 by one frame period. An output signal of the frame memory 105 is supplied to the three-dimensional noise reduction circuit 106.

The three-dimensional noise reduction circuit 106 performs three-dimensional noise reduction or two-dimensional noise reduction on the luminance signal Y1 output from the three-dimensional Y/C separation circuit 103 on the basis of the output signal of the frame memory 105 and the motion signal MS output from the motion detection circuit 102.

In this embodiment, the three-dimensional Y/C separation circuit 103 corresponds to the separation circuit, the three-dimensional noise reduction circuit 106 corresponds to the noise reduction circuit, and the motion detection circuit 102 corresponds to the motion detection circuit. The frame memory 101 corresponds to the first delay circuit, and the frame memory 105 corresponds to the second delay circuit.

Operations of the video signal processing circuit shown in FIG. 1 are now described. First, the frame memory 101 delays the input composite video signal VD by one frame period. The motion detection circuit 102 calculates a frame-to-frame differential value of the composite video signal VD on the basis of the composite video signal VD and the output signal of the frame memory 101, and outputs the motion signal MS responsive to the differential value.

Figure 2:
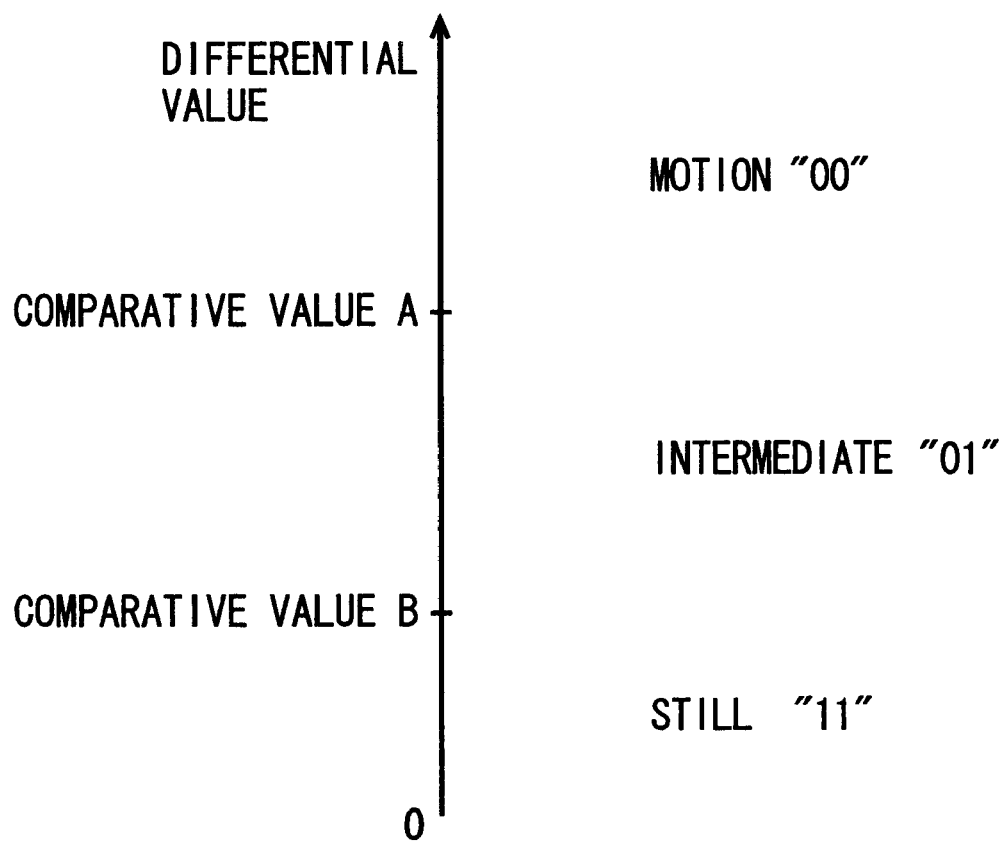
FIG. 2 illustrates the relation between a frame-to-frame differential value of a composite video signal and motion and still states of an image.

FIG. 2 illustrates the relation between the frame-to-frame differential value of the composite video signal and motion and still states of the image.

As shown in FIG. 2, the image is determined as "still" if the differential value is less than a comparative value B, or determined as "motion" if the differential value is greater than a comparative value A. If the differential value is within the range from the comparative value A to the comparative value B, the image is determined as "intermediate" between "motion" and "still".

The motion signal MS is "00" if the result of the determination is "motion", while the motion signal MS is "11" if the result of the determination is "still". If the result of the determination is "intermediate", the motion signal MS is "01".

The three-dimensional Y/C separation circuit 103 performs three-dimensional Y/C separation or two-dimensional Y/C separation on the composite video signal VD on the basis of the motion signal MS output from the motion detection circuit 102.

In this case, video signals of adjacent two lines (scanning lines) or video signals of the same lines in continuous two frames have correlation, and chrominance signals superposed on the two video signals are of opposite phase with each other, or of 180 degrees out-of-phase. Therefore, a chrominance signal is extracted and a luminance signal is cancelled by performing subtraction on a composite video signal between adjacent lines, for example. Further, a chrominance signal is extracted and a luminance signal is cancelled by performing subtraction on a composite video signal between continuous frames, for example. The former method of separating a chrominance signal is referred to as two-dimensional Y/C separation, and the latter method of separating a chrominance signal is referred to as three-dimensional Y/C separation.

When the motion signal MS output from the motion detection circuit 102 indicates "still", the composite video signal VD is subjected to three-dimensional Y/C separation using an inter-frame operation. In this case, the chrominance signal is extracted by performing subtraction on the composite video signal VD and the output signal of the frame memory 101, and the luminance signal is extracted by subtracting the chrominance signal from the composite video signal VD.

When the motion signal MS output from the motion detection circuit 102 indicates "motion", the composite video signal VD is subjected to two-dimensional Y/C separation using an inter-line operation. In this case, the chrominance signal is extracted by performing subtraction on a composite video signal VD of an adjacent line, and the luminance signal is extracted by subtracting the chrominance signal from the composite video signal VD.

When the motion signal MS output from the motion detection circuit 102 indicates "intermediate", the weighted mean of a luminance signal obtained by three-dimensional Y/C separation using an inter-frame operation and a luminance signal obtained by two-dimensional Y/C separation using an inter-line operation is found, and the weighted mean of a chrominance signal obtained by three-dimensional Y/C separation using an inter-frame operation and a chrominance signal obtained by two-dimensional Y/C separation using an inter-line operation is found.

Thus, the luminance signal Y1 and the chrominance signal C1 are separated from the composite video signal VD.

As to a still picture, three-dimensional Y/C separation is performed using an inter-frame operation thereby improving the S/N. As to a motion picture, on the other hand, two-dimensional Y/C separation is performed using an intra-frame operation.

Then, the frame memory 105 delays the luminance signal Y1 output from the three-dimensional Y/C separation circuit 103 by one frame period. Further, the three-dimensional noise reduction circuit 105 performs three-dimensional noise reduction or two-dimensional noise reduction on the luminance signal Y1 output from the three-dimensional Y/C separation circuit 103 on the basis of the motion signal MS.

When the motion signal MS output from the motion detection circuit 102 indicates "still", the luminance signal Y1 is subjected to three-dimensional noise reduction using an inter-frame operation. According to this embodiment, the weighted mean of the luminance signal Y1 and the output signal of the frame memory 105 is found by the three-dimensional noise reduction, and the result is output as a luminance signal Y2.

When the motion signal MS output from the motion detection circuit 102 indicates "motion", the luminance signal Y1 is subjected to two-dimensional noise reduction using an intra-frame operation. According to this embodiment, the luminance signal Y1 is directly output as the luminance signal Y2, by the two-dimensional noise reduction.

When the motion signal MS output from the motion detection circuit 102 indicates "intermediate", the weighted mean of a luminance signal obtained by three-dimensional noise reduction using an inter-frame operation and a luminance signal obtained by two-dimensional noise reduction using an intra-frame operation is found and the result is output as the luminance signal Y2.

According to this embodiment, the three-dimensional noise reduction circuit 106 directly outputs the chrominance signal C1 as a chrominance signal C2.

Thus, as to a still picture, noise is reduced by three-dimensional noise reduction using an inter-frame operation. As to a motion picture, on the other hand, noise is reduced by two-dimensional noise reduction using an intra-frame operation.

The video signal processing circuit according to this embodiment employs the motion detection circuit 102 in common for the three-dimensional Y/C separation circuit 103 and the three-dimensional noise reduction circuit 106, whereby motion of the image is smoothed, the degree of integration can be improved and the cost can be reduced.

Further, noise is reduced in the three-dimensional Y/C separation circuit 103 and the three-dimensional noise reduction circuit 106, whereby the S/N is further improved and higher picture quality is attained.

An inter-line operation or coring may be performed as the two-dimensional reduction. Frame-cyclic noise reduction may be performed as the three-dimensional noise reduction.

While three-dimensional noise reduction or two-dimensional noise reduction is performed as to the separated luminance signal Y1 in this embodiment, three-dimensional noise reduction or two-dimensional noise reduction may be performed also as to the chrominance signal C1.

Figure 3:
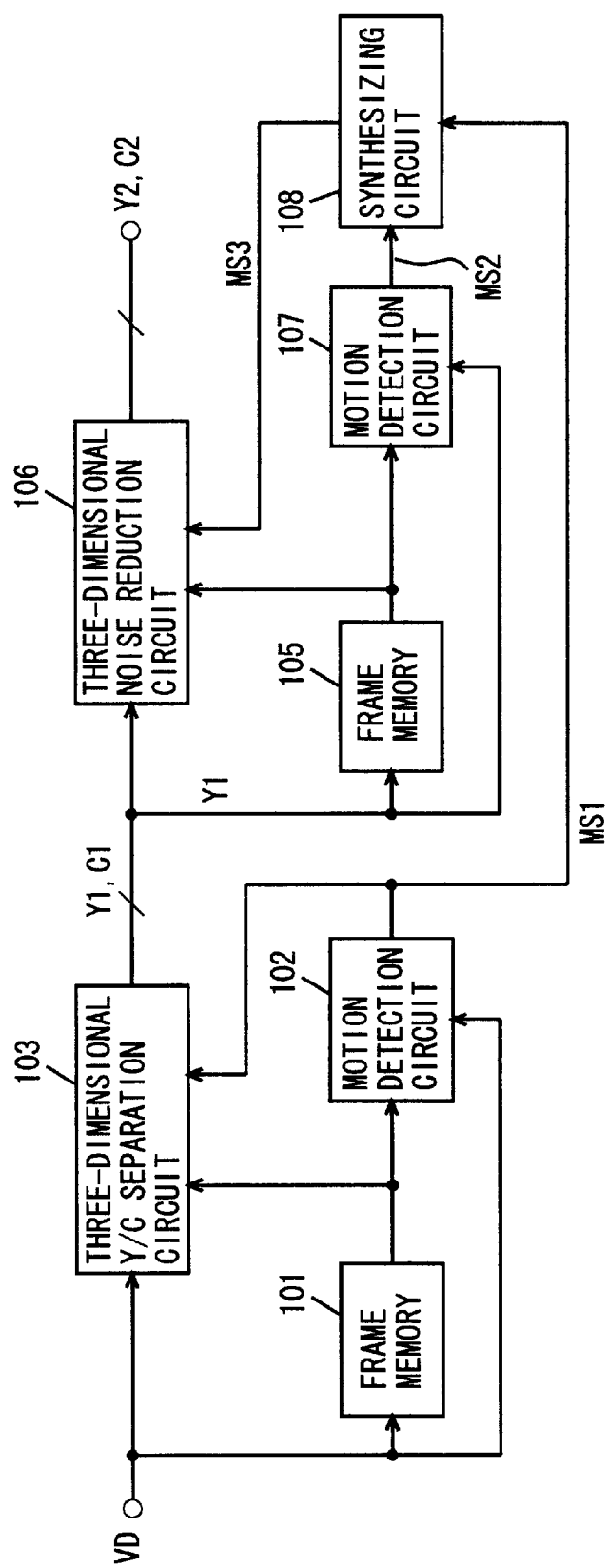
FIG. 3 is a block diagram showing a video signal processing circuit according to a second embodiment of the present invention.

FIG. 3 is a block diagram showing a video signal processing circuit according to a second embodiment of the present invention.

The video signal processing circuit shown in FIG. 3 is different from that shown in FIG. 1 in a point that a motion detection circuit 107 and a synthesizing circuit 108 are additionally provided.

A motion detection circuit 102 outputs a motion signal MS1. The motion signal MS1 is supplied to a three-dimensional Y/C separation circuit 103 and the synthesizing circuit 108. A luminance signal Y1 output from the three-dimensional Y/C separation circuit 103 is supplied to a frame memory 105 and the motion detection circuit 107.

The frame memory 105 delays the luminance signal Y1 by one frame period. An output signal of the frame memory 105 is supplied to a three-dimensional noise reduction circuit 106 and the motion detection circuit 107.

The motion detection circuit 107 detects presence/absence of motion in an image on the basis of the luminance signal Y1 output from the three-dimensional Y/C separation circuit 103 and the output signal of the frame memory 105, and outputs a motion signal MS2 indicating the result of the detection. The motion signal MS2 output from the motion detection circuit 107 is supplied to the synthesizing circuit 108.

The synthesizing circuit 108 synthesizes the motion signal MS1 output from the motion detection circuit 102 and the motion signal MS2 output from the motion detection circuit 107. A synthetic signal MS3 output from the synthesizing circuit 108 is supplied to the three-dimensional noise reduction circuit 106.

The remaining structure of the video signal processing circuit shown in FIG. 3 is similar to that of the video signal processing circuit shown in FIG. 1.

In this embodiment, the three-dimensional Y/C separation circuit 103 corresponds to the separation circuit, the three-dimensional noise reduction circuit 106 corresponds to the noise reduction circuit, the motion detection circuit 102 corresponds to the first motion detection circuit, and the motion detection circuit 107 corresponds to the second motion detection circuit. The frame memory 101 corresponds to the first delay circuit, the frame memory 105 corresponds to the second delay circuit, and the synthesizing circuit 108 corresponds to the synthesizing circuit.

Operations of the video signal processing circuit shown in FIG. 3 are now described. First, the frame memory 101 delays an input composite video signal VD by one frame period. The motion detection circuit 102 calculates the differential value between the composite video signal VD and the output signal of the frame memory 101, and outputs the motion signal MS1 responsive to the differential value. Thus, presence/absence of motion in the image is detected by the frame-to-frame difference of the composite video signal VD.

The three-dimensional Y/C separation circuit 103 performs three-dimensional Y/C separation or two-dimensional Y/C separation on the composite video signal VD on the basis of the motion signal MS1 output from the motion detection circuit 102.

When the motion signal MS1 output from the motion detection circuit 102 indicates "still", the composite video signal VD is subjected to three-dimensional Y/C separation using an inter-frame operation. In this case, the chrominance signal is extracted by performing subtraction on the composite video signal VD and the output signal of the frame memory 101, and the luminance signal is extracted by subtracting the chrominance signal from the composite video signal VD.

When the motion signal MS1 output from the motion detection circuit 102 indicates "motion", the composite video signal VD is subjected to two-dimensional Y/C separation using an inter-line operation. In this case, the chrominance signal is extracted by performing subtraction on a composite video signal VD of an adjacent line, and the luminance signal is extracted by subtracting the chrominance signal from the composite video signal VD.

When the motion signal MS1 output from the motion detection circuit 102 indicates "intermediate", the weighted mean of a luminance signal obtained by three-dimensional Y/C separation using an inter-frame operation and a luminance signal obtained by two-dimensional Y/C separation using an inter-line operation is found and the weighted mean of a chrominance signal obtained by three-dimensional Y/C separation using an inter-frame operation and a chrominance signal obtained by two-dimensional Y/C separation using an inter-line operation is found.

Thus, the luminance signal Y1 and the chrominance signal C1 are separated from the composite video signal VD.

As to a still picture, three-dimensional Y/C separation is performed using an inter-frame operation, thereby improving the S/N. As to a motion picture, on the other hand, two-dimensional Y/C separation is performed using an intra-frame operation.

Then, the frame memory 105 delays the luminance signal Y1 output from the three-dimensional Y/C separation circuit 103 by one frame period. Then, the motion detection circuit 107 calculates the differential value between the luminance signal Y1 output from the three-dimensional Y/C separation circuit 103 and the output signal of the frame memory 105, and outputs a motion signal MS2 responsive to the differential value. Thus, presence/absence of motion in the image is detected on the basis of frame-to-frame difference of the luminance signal Y1.

In this case, the motion detection circuit 107 performs motion detection on the basis of the luminance signal Y1 separated from the composite video signal VD by the three-dimensional Y/C separation circuit 103 and improved in S/N, whereby a detection result of high precision can be obtained.

Then, the synthesizing circuit 108 synthesizes the motion signal MS1 output from the motion detection circuit 102 and the motion signal MS2 output from the motion detection circuit 107. The motion signals MS1 and MS2 can be synthesized by any logical operation such as a weighted mean operation, an OR operation or an AND operation.

According to this embodiment, the synthetic signal MS3 output from the synthesizing circuit 108 indicates "motion" when at least one of the motion signals MS1 and MS2 indicates "motion", while otherwise indicating "still". Thus, the synthesizing circuit 108 is set in a motion priority mode.

Further, the three-dimensional noise reduction circuit 106 performs three-dimensional noise reduction or two-dimensional noise reduction on the luminance signal Y1 output from the three-dimensional Y/C separation circuit 103 on the basis of the synthetic signal MS3.

When the synthetic signal MS indicates "still", the luminance signal Y1 is subjected to three-dimensional noise reduction using an inter-frame operation. According to this embodiment, the weighted mean of the luminance signal Y1 and the output signal of the frame memory 105 is found by the three-dimensional noise reduction, and the result is output as a luminance signal Y2.

When the synthetic signal MS3 indicates "motion", the luminance signal Y1 is subjected to two-dimensional noise reduction using an intra-frame operation. According to this embodiment, the luminance signal Y1 is directly output as the luminance signal Y2, by the two-dimensional noise reduction.

When the synthetic signal MS3 indicates "intermediate", the weighted mean of a luminance signal obtained by three-dimensional noise reduction using an inter-frame operation and a luminance signal obtained by two-dimensional noise reduction using an intra-frame operation is found and the result is output as the luminance signal Y2.

According to this embodiment, the three-dimensional noise reduction circuit 106 directly outputs the chrominance signal C1 as the chrominance signal C2.

Thus, as to a still picture, noise is reduced by three-dimensional noise reduction using an inter-frame operation. As to a motion picture, on the other hand, noise is reduced by two-dimensional noise reduction using an intra-frame operation.

The video signal processing circuit according to this embodiment employs the motion detection circuit 102 in common for the three-dimensional Y/C separation circuit 103 and the three-dimensional noise reduction circuit 106, whereby motion of the image is smoothed, the degree of integration can be improved and the cost can be reduced.

Further, noise is reduced in the three-dimensional Y/C separation circuit 103 and the three-dimensional noise reduction circuit 106, whereby the S/N is further improved and higher picture quality is attained.

In addition, the motion detection circuit 107 performs motion detection on the basis of the separated luminance signal Y1 and the three-dimensional noise reduction circuit 106 performs three-dimensional noise reduction or two-dimensional noise reduction on the basis of the synthetic signal MS3 of the motion signal MS1 and the motion signal MS2, whereby the precision of motion detection is improved and false detection is reduced. Consequently, the S/N is further improved, to attain higher picture quality.

An inter-line operation or coring may be performed as the two-dimensional reduction. Frame-cyclic noise reduction may be performed as the three-dimensional noise reduction.

While three-dimensional noise reduction or two-dimensional noise reduction is performed as to the separated luminance signal Y1 in this embodiment, three-dimensional noise reduction or two-dimensional noise reduction may be performed also as to the chrominance signal C1.

The synthesizing circuit 108 may be set in a still priority mode outputting a synthetic signal MS3 indicating "still" when at least one of the motion signals MS1 and MS2 indicates "still".

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video signal processing circuit comprising:
a detection circuit detecting presence/absence of motion in an image;
a separation circuit separating a luminance signal and a chrominance signal from a composite video signal by an inter-frame operation or an intra-frame operation on the basis of a result of detection by said detection circuit;
a first delay circuit delaying said composite video signal by one or more vertical scanning periods;
a second delay circuit delaying at least said luminance signal output from said separation circuit by one or more vertical scanning periods; and
a noise reduction circuit reducing noise of at least said luminance signal output from said separation circuit by an inter-frame operation on the basis of the result of detection by said detection circuit, wherein said detection circuit includes:
a first motion detection circuit detecting presence/absence of motion in said image by operating on said composite video signal and on an output signal of said first delay circuit,
a second motion detection circuit detecting presence/absence of motion in said image by operating on said luminance signal output from said separation circuit and on an output signal of said second delay circuit, and
a synthesizing circuit synthesizing output signals of said first motion detection circuit and said second motion detection circuit,
said separation circuit separating said luminance signal and said chrominance signal from said composite video signal by an inter-frame operation or an intra-frame operation on the basis of said output signal of said first motion detection circuit operating on said composite video signal and on said output signal of said first delay circuit, and
said noise reduction circuit reducing noise of at least said luminance signal output from said separation circuit by an inter-frame operation or an intra-frame operation on the basis of an output signal of said synthesizing circuit, said luminance signal output from said separation circuit and said output signal of said second delay circuit, wherein
said separation circuit performs an intra-frame operation when said output signal of said first motion detection circuit indicates presence of motion in said image, and performs an inter-frame operation when said output signal of said first motion detection circuit indicates absence of motion in said image, and
said noise reduction circuit performs an intra-frame operation or no operation when said output signal of said synthesizing circuit indicates presence of motion in said image, and performs an inter-frame operation when said output signal of said synthesizing circuit indicates absence of motion in said image, wherein:
said first motion detection circuit calculates a differential value between said composite video signal and said output signal of said first delay circuit and detects presence/absence of motion in said image on the basis of said calculated differential value, and
said second motion detection circuit calculates a differential value between at least said luminance signal output from said separation circuit and said output signal of said second delay circuit and detects the presence/absence of motion in said image on the basis of said calculated differential value, wherein
said first motion detection circuit determines that said image has motion when said calculated differential value is greater than a first value, determines that said image has no motion when said calculated differential value is less than a second value, and determines that motion in said image is in an intermediate state when said calculated differential value is within the range from said first value to said second value, and said second motion detection circuit determines that said image has motion when said differential value is greater than a third value, determines that said image has no motion when said differential value is less than a fourth value, and determines that motion in said image is in an intermediate state when said differential value is within the range from said third value to said fourth value.

2. The video signal processing circuit in accordance with claim 1, wherein said separation circuit performs an operation employing a result of an intra-frame operation and a result of an inter-frame operation when said first motion detection circuit determines that motion in said image is in said intermediate state, and said noise reduction circuit performs an operation employing a result of an intra-frame operation and a result of an inter-frame operation when said second motion detection circuit determines that motion in said image is in said intermediate state.

3. The video signal processing circuit in accordance with claim 1, wherein said separation circuit separates said luminance signal and said chrominance signal from said composite video signal by an operation using composite video signals of adjacent two lines as said intra-frame operation when said detection circuit detects presence of motion in said image, and separates said luminance signal and said chrominance signal from said composite video signal by an operation using composite video signals of the same lines in continuous two frames as said inter-frame operation when said detection circuit detects absence of motion in said image.

4. The video signal processing circuit in accordance with claim 1, wherein said noise reduction circuit performs an operation using at least luminance signals of adjacent two lines as said intra-frame operation or performs no operation when said detection circuit detects presence of motion in said image, and performs an operation using at least luminance signals of the same lines in continuous two frames as said inter-frame operation when said detection circuit detects absence of motion in said image.

5. The video signal processing circuit in accordance with claim 1, wherein said separation circuit includes a three-dimensional Y/C separation circuit, and said noise reduction circuit includes a three-dimensional noise reduction circuit.

6. A video signal processing method including the steps of:

detecting presence/absence of motion in an image;

separating a luminance signal and a chrominance signal from a composite video signal by an inter-frame operation or an intra-frame operation on the basis of the result of detection of the presence/absence of motion in said image;

delaying said composite signal by one or more vertical scan periods;

delaying said luminance signal by one or more vertical scan periods; and reducing noise of at least said luminance signal by an inter-frame operation or an intra-frame operation on the basis of the result of detection of the motion in said image, wherein said step of detecting the presence/absence of noise includes the steps of:

detecting the presence/absence of the motion in said image on the basis of said composite video signal and said delayed composite signal;

detecting the presence/absence of the motion in said image on the basis of said separated luminance signal and said delayed luminance signal; and synthesizing the result of detecting on the basis of said composite video signal and said delayed composite video signal, and the result of detecting on the basis of said separated luminance signal and said delayed separated luminance signal, wherein said step of separating said luminance signal and said chrominance signal further includes the step of separating said luminance signal and said chrominance signal from said composite video signal by an inter-frame operation or an intra-frame operation on the basis of said delayed composite signal, and wherein said step of reducing the noise further includes the step of reducing the noise of at least said separated luminance signal by an inter-frame operation or an intra-frame operation on the basis of, said synthesized output signal, said luminance signal, and said delayed luminance signal, and said step of separation further includes the step of performing an intra-frame operation when said step of detecting the presence/absence of the motion in said image on the basis of said composite video signal indicates presence of motion in said image, and performing an inter-frame operation when said step of detecting the presence/absence of the motion in said image on the basis of said composite video signal indicates absence of motion in said image, and further including the step of performing an intra-frame operation or no operation when the step of synthesizing indicates presence of motion in said image, and performing an inter-frame operation when said synthesizing step indicates absence of motion in said image, wherein said video signal processing method further comprises the steps of:

calculating a differential value between said composite video signal and said delayed composite signal and detecting the presence/absence of motion in said image on the basis of said calculated differential value, determining that said image has motion when said calculated differential value is greater than a first value, determining that said image has no motion when said calculated differential value is less than a second value, and determining that motion in said image is in an intermediate state when said calculated differential value is within the range from said first value to said second value;

calculating a differential value between said luminance and delayed luminance signal and detecting the presence/absence of motion in said image on the basis of said calculated differential value, and determining that said image has motion when said differential value is greater than a third value, determining that said image has no motion when said differential value is less than a fourth value, and determining that motion in said image is in an intermediate state when said differential value is within the range from said third value to said fourth value.

7. The video signal processing method in accordance with claim 6, further including the step of performing an operation employing a result of an intra-frame operation and a result of an inter-frame operation on said composite signal when motion in said image is in said intermediate state, and performing an operation employing a result of an intra-frame operation and a result of an inter-frame operation on said separated luminance signal when motion in said image is in said intermediate state.

8. The video signal processing method in accordance with claim 6, further including the step of separating said luminance signal and said chrominance signal from said composite video signal by an operation using composite video signals of adjacent two lines as said intra-frame operation in said separation circuit when motion is detected in said image, and separating said luminance signal and said chrominance signal from said composite video signal by an operation using composite video signals of the same lines in continuous two frames as said inter-frame operation when absence of motion is detected in said image.

9. The video signal processing method in accordance with claim 6, further including the step of performing an operation using at least luminance signals of adjacent two lines as said intra-frame operation or performing no operation when motion in said image is detected, and performing an operation using at least luminance signals of the same lines in continuous two frames as said inter-frame operation absence of motion in said image is detected.

10. The video signal processing method in accordance with claim 6, wherein said step of separation includes three-dimensional Y/C separation and the step of noise reduction includes the step of three-dimensional noise reduction.

\* \* \* \* \*